United States Patent Office 3,739,005
Patented June 12, 1973

3,739,005
PREPARATION OF AROMATIC POLYISOCY-
ANATES BY CATALYTIC CARBONYLATION
OF NITRO COMPOUNDS
James D. McClure, Oakland, Calif., assignor to Shell
Oil Company, Houston, Tex.
No Drawing. Filed Dec. 13, 1971, Ser. No. 207,654
Int. Cl. C07c *119/04*
U.S. Cl. 260—453 PC                    14 Claims

ABSTRACT OF THE DISCLOSURE

An improved process for preparing carbocyclic aromatic isocyanates comprises contacting a carbocyclic aromatic polynitro compound with carbon monoxide in the presence of a catalyst system consisting of certain noble metal halides, an organic isocyanide and at least one compound selected from the group consisting of iron molybdate, manganese molybdate and iron borate.

BACKGROUND OF THE INVENTION

It is known that aromatic isocyanates can be prepared from aromatic nitro compounds by a two-step process which comprises (1) reducing the nitro compound to the corresponding amine and (2) contacting the amine with phosgene. See, for example, W. Siefram, Liebigs Annalen der Chemie, vol. 565 (1949) at page 96 and Germassmer, U.S. Pat. No. 3,188,337. It would be of advantage, however, to prepare aromatic polyisocyanates in a one-step process directly from aromatic polynitro compounds without prior or separate reduction to the corresponding polyamine. It would also be of advantage to prepare such aromatic polyisocyanates in a process which does not require the highly corrosive and toxic phosgene.

In order to provide such a simplified technique, it has been proposed to react an organic nitro compound with carbon monoxide in the presence of various metal catalysts. For example, British Pat. No. 1,025,436 describes a process for preparing isocyanates from the corresponding nitro compounds by reacting the organic nitro compound with carbon monoxide in the presence of a noble metal or compound thereof. However, this process results in the production of no more than trace amounts of organic polyisocyanate when an aromatic polynitro compound such as dinitrotoluene is reacted with carbon monoxide using as a catalyst a noble metal compound such as rhodium trichloride, palladium dichloride, iridium trichloride or osmium trichloride.

Other related techniques utilize noble metal-based catalyst systems wherein additional components are added as promoters. For example, U.S. Pat. No. 3,461,149 describes the use of a catalyst system consisting of a noble metal or noble metal compound and a Lewis acid in the reaction of an organic nitro compound with carbon monoxide. However, the yield of aromatic diisocyanates from the corresponding aromatic dinitro compounds afforded by this process is still economically unattractive.

Other catalyst systems reported disclose the use of noble metal compounds with non-noble metal compounds (U.S. Pat. No. 3,523,966), with organophosporus compounds (U.S. Pat. No. 3,523,962) and with acid halides used as promoters (U.S. Pat. No. 3,523,965). These catalyst systems exhibit little or no selectivity for the production of diisocyanates from the corresponding dinitro compounds.

Other noble metal based catalyst systems have been disclosed which additionally contain a heteroaromatic nitrogen compound U.S. Pat. No. 3,576,835, a Group V–B or VI–B metal oxide together with an inorganic copper compound (U.S. Pat. No. 3,523,963) or discrete particles of iron oxide (published Netherlands application No. 6913250). However, utilization of these catalyst systems to produce isocyanates from a polynitro compound such as dinitrotoluene results in only moderate selectivity to a diisocyanate product when high total selectivity to isocyanate products is obtained. Moreover, such catalyst systems exhibit a marked decrease in selectivity to total isocyanate products at higher conversion levels.

It would be an advantage to utilize a catalyst which would afford a high selectivity to the polyisocyanate product at high levels of conversion of reactants in a one-step process wherein the polyisocyanate is produced directly from the corresponding polynitro compound. The term "polyisocyanate" as used herein refers to an organic compound with a plurality of isocyanate groups and does not refer to a polymeric material involving the isocyanate group.

SUMMARY OF THE INVENTION

It has now been found that carbocyclic aromatic polyisocyanates can be prepared in an improved process by contacting a carbocyclic aromatic polynitro compound with carbon monoxide at elevated temperature and pressure in the presence of a catalyst system consisting of certain noble metal halides, an organic isocyanate, and at least one compound selected from the group consisting of iron molybdate, manganese molybdate and iron borate.

Noble metal halides such as palladium dichloride and rhodium trichloride, while individually inactive as catalysts for the conversion of aromatic nitro compounds to isocyanates are complexed with organic isocyanides such as 4-methoxyphenyl isocyanide and n-butyl isocyanide to form an improved catalyst system which produces high conversions of the polynitro compound with a very high selectivity to isocyanate products. The activity of such catalyst systems is further improved by the addition thereto of certain metal molybdates and borates.

DESCRIPTION OF THE PREFERRED EMBODIMENTS

The improved process of the invention is conducted by contacting an aromatic carbocyclic polynitro compound with carbon monoxide at elevated temperature and pressure in the presence of a catalyst system as herein described to convert at least one but preferably all of the nitro groups to isocyanate groups. It appears likely that the reaction proceeds according to the following equation wherein dinitrotoluene has been selected as exemplary of polynitro compounds which may be used in practicing the process of this invention.

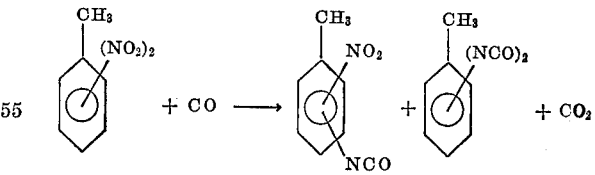

From the above equation it can be seen that more than one mole of carbon monoxide is required for the conversion of each mole of nitro group to the desired isocyanate product, and in practice the reaction is conducted in the presence of carbon monoxide equivalent to or in excess of that required for the reaction. In general, molar ratios of carbon monoxide to aromatic nitro reactant vary from about 3:1 to about 100:1.

Aromatic nitro compound

The process of the invention is generally applicable to aromatic polynitro compounds in which each nitro group is attached to an aromatic carbon atom, i.e., a carbon atom which is a member of a six-membered carbocyclic aromatic ring. The aromatic polynitro compound is monocyclic or polycyclic of up to four fused or separate aromatic rings, preferably of from one to two aromatic rings, has from 6 to 30 carbon atoms, preferably from 6 to 15 carbon atoms, and has from two to four nitro groups, preferably from two to three nitro groups, which comprises the only nitro groups present within the molecule. The aromatic polynitro compounds are carbocyclic aromatic polynitro compounds containing only carbon and hydrogen other than the nitrogen and oxygen atoms of the nitro groups or are substituted carbocyclic aromatic polynitro compounds additionally containing non-interfering substituents such as halogens of atomic number 9 to 53 inclusive, i.e., fluorine, chlorine, bromine, and iodine or atoms of oxygen and sulfur incorporated in non-interfering functional groups such as alkoxy, aryloxy, alkaryloxy, carbalkoxy, alkylthio and arylthio.

One class of such suitable aromatic compounds is represented by the Formula I

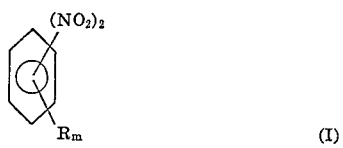

(I)

wherein $m$ is a whole number from 0 to 3 inclusive and represents he number of R groups attached to the aromatic ring and R independently is nitro; hydrocarbyl of up to 10 carbon atoms; halogen of atomic number from 9 to 53 inclusive, preferably of atomic number from 17 to 35 inclusive, e.g., chlorine and bromine, alkoxy of up to 6 carbon atoms, e.g., methoxy, ethoxy and the like; aryloxy or alkaryloxy of up to 10 carbon atoms, such as benzyloxy, tolyloxy and the like; alkylthio of up to 6 carbon atoms such as methylthio and p-methylthio; or arylthio of up to 10 carbon atoms such as phenylthio and p-methylphenylthio. Hydrocarbyl R groups are preferably free from aliphatic unsaturation and include alkyl such as methyl, ethyl, propyl, pentyl and hexyl; cycloalkyl such as cyclopentyl and cyclohexyl; arylalkyl such as benzyl and phenylethyl; and aryl and alkaryl such as phenyl; tolyl and xylyl. The R groups of Formula I may all be the same or may be in part or wholly different.

Exemplary aromatic polynitro compounds of Formula I are 1,2-dinitrobenzene,
1,3-dinitrobenzene,
1,4-dinitrobenzene,
1,2,4-trinitrobenzene,
1,3,5-trinitrobenzene,
2,4-dinitrotoluene,
2,6-dinitrotoluene,
1-ethyl-3,5-dinitrobenzene,
1-propyl-2,4-dinitrobenzene,
1,2-dimethyl-3,5-dinitrobenzene,
1-cycloheptyl-2,4-dinitrobenzene,
1-phenyl-3,5-dinitrobenzene,
1-(1-phenylethyl)-2,4-dinitrobenzene,
1-bromo-3-phenyl-2,4-dinitrobenzene,
1-methoxy-2,4-dinitrobenzene,
1-phenoxy-2,4-dinitrobenzene,
1-benzyloxy-3,5-dinitrobenzene,
1-methoxy-3-methyl-2,4-dinitro-5-chlorobenzene,
1-phenylthio-2,4-dinitrobenzene,
1-chloro-2-methoxy-4-methylthio-3,5-dinitrobenzene,
1-phenoxy-3-chloro-2,4-dinitrobenze and
1-ethylthio-2,4-dinitrobenzene.

Other suitable aromatic polynitro compounds include polycyclic aromatic polynitro compounds such as bicyclic naphthyl polynitro compounds, e.g., 1,3-dinitronaphthalene,
1-chloro-2,4-dinitronaphthalene,
1,5-dinitronaphthalene,
1,8-dinitronaphthalene,
1,3,5-trinitronaphthalene,
1,3,6,8-tetranitronaphthalene, and tricyclic polynitro compounds, e.g., dinitroanthacene and 2,7-dinitrophenanthrene.

Aromatic polynitro compounds of Formula I having two to three nitro groups and having R groups selected from nitro, halogen and alkyl are preferably employed in the process of the invention.

The catalyst

The chemical transformations during the course of the reaction which involve the catalyst are quite complex and no one single structure adequately describes the actual catalyst species. Although it is not desired to be bound by any particular theory, it appears that the actual catalyst species is the noble metal halide complexed with an organic isocyanide and carbon monoxide and promoted by a metal molybdate or borate as co-catalyst.

The complex can be formed in situ, as for example by adding the noble metal halide, the organic isocyanide and the metal molybdate or borate to the reaction environment in the presence of carbon monoxide. However, in one modification of the instant invention, the catalyst is preformed before use. For example, para-methoxy phenyl isocyanide readily complexes with palladium dichloride to form $(4-CH_3OC_6H_4NC)_2PdCl_2$ which is thereafter contacted with carbon monoxide in the presence of a metal molybdate to form $$(4-CH_3OC_6H_4NC)(CO)PdCl_2.$$

This carbonyl-isocyanide complex is suitable for direct use in the reaction of this invention.

Noble metal halides which can be utilized in the process of the invention include palladium dichloride, palladium dibromide, palladium diiodide, rhodium trichloride, rhodium tribromide and rhodium triiodide. Organic isocyanides which can be complexed or admixed with the noble metal halide and are useful within the process of this invention are represented by the formula

wherein R is monovalent hydrocarbyl of about 3 to 30 carbon atoms free from acetylenic unsaturation and with up to 2 aromatic rings and monovalent substituted hydrocarbyl of about 3 to 30 carbon atoms free from acetylenic unsaturation and with up to 2 aromatic rings. Illustrative hydrocarbyl R groups include alkyl R groups such as methyl, ethyl, propyl, butyl, isobutyl, and hexyl; alkenyl R groups such as vinyl, and propenyl; cycloalkyl R groups such as cyclohexyl and cyclooctyl; cycloalkenyl R groups such as cyclohexenyl and cyclooctadienyl; and aromatic R groups such as phenyl and naphthyl. Illustrative substituted hydrocarbyl R groups include aralkyl R groups such as benzyl; carbalkoxyalkyl R groups such as carbethoxymethyl; alkaryl R groups such as tolyl and xylyl; and alkoxyaryl R group such as methoxyphenyl. The organic moieties referred to above may also contain halogen substituents such as fluorine, chlorine and bromine.

The metal molybdates which are useful as catalyst components are those of iron and manganese. The term "molybdate" as used herein includes the normal or mono molybdates as well as polymolybdates. Metal molybdates which are effective as co-catalysts include ferrous ($Fe^{II}$) molybdate, $FeMoO_4$; manganous ($Mn^{II}$) molybdate, $MnMoO_4$; ferric ($Fe^{III}$) molybdate, $Fe_2(MoO_4)_3$; manganic ($Mn^{IV}$) molybdate, $Mn(MoO_4)_2$; and polymolybdates such as ferric heptamolybdate, $Fe_2Mo_7O_{24}$ and manganese polymolybdate, $MnMo_{20}O_{61}$.

The borates which are useful as catalyst components are those of iron. Illustrative iron borates include ferric orthoborate, ferrous triborate, ferric metaborate and ferrous hexaborate.

The amount of catalyst system used in the process of the invention is not critical. The ratio of moles of nitro group to mole of noble metal halide can be selected to obtain the desired conversion level or selectivities at a given residence time in the reaction zone. Molar ratios of nitro groups/noble metal halide of up to 132:1 have proven satisfactory in batch operations with a reaction period of four hours; however, ratios between 33:1 and 66:1 are preferred.

The quantity of organic isocyanide required is that amount which theoretically will complex with the noble metal halide. For example, each mole of palladium dichloride will theoretically complex with two moles of the organic isocyanide, whereas each mole of rhodium trichloride will theoretically complex with three moles of the organic isocyanide. However, in practice, amounts ranging from about one-half to about 2 times the amount theoretically required have been used with satisfactory results.

The amount of metal molybdate and/or borate to be incorporated into the catalyst system is not critical. However, at a molybdenum or borate to noble metal ratio below about 1:10 the catalytic activity becomes somewhat impaired. In general, the catalysts perform satisfactorily when the molybdenum or borate to noble metal ratio is from about 1:4 to about 4:1.

The reaction conditions

The process of the invention is conducted by any of a variety of procedures. In one modification, the aromatic nitro compound, catalyst and carbon monoxide are charged to an autoclave or similar pressure reactor for operations in a batchwise manner. In another modification, reaction is effected in a continuous operation as by contacting the entire reaction mixture during passage through a tubular reactor. It is equivalently useful to add the carbon monoxide continuously throughout the period of the reaction.

The carbon monoxide is of normal commercial quality and may also contain dioxide and other diluents which are inert in the reaction environment. These diluents should not be of such quantities as to require excessively large process equipment. For example, carbon monoxide additionally containing carbon dioxide in a $CO/CO_2$ molar ratio up to 6:1 is satisfactory.

In any modification, the reaction is conducted at elevated temperature and pressure. Suitable reaction temperatures vary from about 100° C. to about 300° C., with best results being obtained at temperatures from about 150° C. to about 250° C. of course, the reaction temperature selected will be below the decomposition temperature of any of the reactants and the desired product.

The reaction pressure will vary from about 500 p.s.i.g. to about 5000 p.s.i.g. When the process of the invention is conducted in a batchwise manner, the initial carbon monoxide pressure described will decrease with time as some of the carbon monoxide is consumed in the reaction. The total reactor pressure will be maintained so that a substantial portion of the reaction components are in the liquid phase.

The process of the invention operates effectively in the absence of a solvent, but improved overall yields of the organic polyisocyanate are obtained when a solvent which is chemically inert in the reaction environment is employed. Suitable solvents include liquid aromatic hydrocarbons such as benzene, toluene and xylene and aryl halides such as mono- and dichlorobenzene. The proportion of solvent used is not critical and any proportion may be utilized which will not require excessively large equipment to contain. Generally, the amount of polynitro compound in the solvent is in the range of from from 10 to about 50 weight percent.

It is important that the solvent, as well as the other materials charged into the reactor, be substantially anhydrous, since in the presence of water, isocyanates are converted to urea derivatives.

Subsequent to reaction, the reaction mixture is separated by conventional means such as distillation, selective extraction and the like. The polyisocyanate product can be further purified, as for example, by distillation. Those compounds separated from the reaction product wherein less than all of the nitro groups are converted to isocyanato groups, can be recycled along with the recovered solvent and further reacted by the process of this invention to convert the remaining nitro groups to isocyanato groups.

Organic polyisocyanates produced by the process of this invention are suitable for use in preparing polyurethane compositions such as foams, coatings, fibers and the like by reacting the polyisocyanate with a suitable polyether polyol in the presence of a catalyst and, if desired, a foaming agent.

The following Illustrative Embodiments are presented to describe the invention more fully without any intention of being limited thereby. All parts and percentages are by weight unless otherwise specified.

ILLUSTRATIVE EMBODIMENT I (A) Preparation of $(4\text{-}CH_3OC_6H_4NC)(CO)PdCl_2$ A mixture of 1.1 g. of $(4\text{-}CH_3OC_6H_4NC)_2PdCl_2$, 0.3 g. $Fe_2Mo_7O_{24}$, and 40 ml. of benzene was charged in the dry box to an 80 ml., 3800 p.s.i. pressure-tested Inconel autoclave. After attachment of the autoclave to a manifold system, 5 g. of carbon monoxide was added. The contents of the reactor were stirred at 190° C. for 1.5 hours during which time the pressure dropped from 1200 to 1100 p.s.i. In the dry box solid (0.3 g.) was removed by filtration and washed five times with benzene. Evaporation of the filtrate afforded 0.98 g. of a brown semi-solid. Recrystallization of the crude product from 10 ml. of toluene afforded 0.7 g. of a brown solid. The IR spectrum of the solid showed strong absorption at 2260 (thought to be PdCNR) and 1950 [thought to be Pd(CO)] cm.$^{-1}$. The product was stable in the presence of carbon monoxide.

(B) Reductive carbonylation of dinitrotoluene with $(4\text{-}CH_3OC_6H_4NC)(CO)PdCl_2/Fe_2Mo_7O_{24}$ catalyst A mixture of 0.68 g. (2 mmole) of $(4\text{-}CH_3OC_6H_4NC)(CO)PdCl_2$, 0.3 g. of $Fe_2Mo_7O_{24}$, 6 g. (33 mmole) of 2,4-dinitrotoluene (Eastman Kodak 99.8% pure), and 20 g. of 1,2-dichlorobenzene (dried over 4 A. mole sieve) was charged in the dry box to a 80 ml., 3900 p.s.i. pressure-tested Inconel autoclave. After attachment of the autoclave to a manifold system, 15–16 g. of carbon monoxide was added which resulted in a reactor pressure of 2200–2400 p.s.i. The contents of the reactor were stirred at 198–200° C. for 4 hours, during which time the pressure dropped from 3400 to 2900 p.s.i. The reaction was mildly exothermic during the first hour so that external heat was only occasionally added during that time. The autoclave was cooled to 0° C. and then slowly vented over a one hour period.

GLC (gas-liquid chromatographic) analysis of the product mixture (26.5 g.) on a 5 foot column packed with 10% polymetaphenyl ether on Chromosorb–W at 200° C. showed the presence of 3.75 g. (65% yield) of 2,4-toluene diisocyanate and 1.15 g. (20% yield) of isocyanatonitrotoluene (mixture of 60–80% 2-isocyanato-4-nitrotoluene and 40–20% 4-isocyanato-2-nitrotoluene). No. 2,4-dinitrotoluene was recovered (100% conversion). The products were isolated in a pure form by GLC trapping and identified by mass spectroscopy.

ILLUSTRATIVE EMBODIMENT II

Into an 80 ml. Inconel autoclave were charged 6 grams, 33 mmole (millimole), of 2,4-dinitrotoluene, 20 g. of dichlorobenzene, 2 mmoles of $(4\text{-}CH_3OC_6H_4NC)_2PdCl_2$ and 0.3 g. of ferric heptamolybdate, $Fe_2Mo_7O_{24}$. To the autoclave was added 15.0 g. of carbon monoxide which resulted in a reactor pressure of 2400 p.s.i.g. The contents of the autoclave were then heated to a temperature of 200° C. and maintained at this temperature for 4 hours, during which time the pressure decreased from about 3500 p.s.i.g. to about 3000 p.s.i.g.

At the end of this four hour reaction period, the autoclave and its contents were cooled and the pressure vented. The contents were discharged and weighed and the autoclave was rinsed with dichlorobenzene. Insoluble matter present (catalyst plus solids formed during the reaction) was filtered from the reaction mixture and washed with dichlorobenzene. The wash solution was combined with the filtrate and the resulting solution was analyzed by gas-liquid chromotography techniques for 2,4-dinitrotoluene, 2,4-toluene diisocyanate (TDI) and the two toluene monoisocyanato (TMI) isomers (2-isocyanato-4-nitrotoluene and 4-isocyanato-2-nitrotoluene).

The analysis revealed that 100 percent of the 2,4-dinitrotoluene was converted into products and that the selectivity to TDI was 60 percent. Selectivity is defined as the ratio of moles of desired product formed to moles of reactant converted, expressed as a percentage. The total selectivity (selectivity to all isocyanate products, e.g., monoisocyanato nitrotoluenes and toluene diisocyanate) was 80 percent.

For comparative purposes tests were run wherein the catalyst system did not contain the organic isocyanide and the ferric molybdate promoter. The procedures used were as described above and the results are shown in Table I.

activity for the conversion of the aromatic nitro compound and a higher selectivity to the polyisocyanate product.

ILLUSTRATIVE EMBODIMENT III

Tests were run according to the procedure of Illustrative Embodiment II wherein various organic isocyanides were tested for effectiveness as a component in a catalyst system in which the organic isocyanide is complexed with palladium dichloride. The results are presented in Table II.

TABLE II

| Catalyst | Millimoles palladium | Co-catalyst (g.) | Conversion weight, percent | Selectivity, percent | | |
|---|---|---|---|---|---|---|
| | | | | TDI | TMI | Total |
| $(4\text{-}CH_3OC_6H_4NC)_2PdCl_2$ | 2 | $Fe_2Mo_7O_{24}$ (0.3) | 100 | 40 | 20 | 80 |
| $(4\text{-}CH_3OC_6H_4NC)_2PdCl_2$ | 1 | $Fe_2Mo_7O_{24}$ (0.15) | 97 | 40 | 43 | 83 |
| $(C_6H_5NC)_2PdCl_2$ | 1 | $Fe_2Mo_7O_{24}$ (0.15) | 98 | 36 | 38 | 74 |
| $(3\text{-}CF_3C_6H_4NC)_2PdCl_2$ | 1 | $Fe_2Mo_7O_{24}$ (0.15) | 94 | 20 | 44 | 64 |
| $(C_6H_{11}NC)_2PdCl_2$ | 2 | $Fe_2Mo_7O_{24}$ (0.3) | 98 | 33 | 33 | 66 |
| $(n\text{-}C_4H_9NC)PdCl_2$ | 2 | $Fe_2Mo_7O_{24}$ (0.3) | 100 | 47 | 23 | 70 |
| $PdCl_2$ | 1 | $Fe_2Mo_7O_{24}$ (0.15) | 50 | 12 | 74 | 86 |
| $(n\text{-}C_4H_9NC)_2PdCl_2$ | 1 | $Fe_2Mo_7O_{24}$ (0.15) | 90 | 23-27 | 49-44 | 72 |

The above data demonstrate that while many organic isocyanides are active in converting the dinitrotoluene to isocyanate products, the selectivity to toluene diisocyanate increases in the following order: Cycloalkylisocyanide <alkylisocyanide<aromatic isocyanides. The data also show selectivity to polyisocyanate products to be a function of catalyst concentration.

ILLUSTRATIVE EMBODIMENT IV

To demonstrate the organic isocyanides of the instant invention are not equivalent to their isomers, the cyanides, tests were run according to the procedure of Illustrative Embodiment II wherein phenyl isocyanide was compared with phenyl cyanide. The data are presented in Table III.

TABLE III

| Catalyst | Millimoles palladium | Co-catalyst (g.) | Conversion weight, percent | Selectivity, percent | | |
|---|---|---|---|---|---|---|
| | | | | TDI | TMI | Total |
| $(C_6H_5NC)_2PdCl_2$ | 2 | $Fe_2Mo_7O_{24}$ (0.3) | 100 | 56 | 15 | 72 |
| $(C_6H_5NC)_2PdCl_2$ | 2 | $Fe_2Mo_7O_{24}$ (0.3) | 81 | 18 | 63 | 81 |

At the same catalyst concentration, the cyanide-containing catalyst gives only ¼ the yield of diisocyanate observed with the isocyanide-containing catalyst.

TABLE I

| Catalyst | Millimoles palladium | Co-catalyst (g.) | Conversion weight, percent | Selectivity, percent | | |
|---|---|---|---|---|---|---|
| | | | | TDI | TMI | Total |
| $PdCl_2$ | 2 | | Inactive | | | |
| $(4\text{-}CH_3OC_6H_4NC)2PdCl_2$ | 2 | | 40 | 8 | 86 | 94 |
| $PdCl_2$ | 2 | $Fe_2Mo_7O_{24}$ (0.3) | 80 | 21 | 64 | 85 |
| $(4\text{-}CH_3OC_6H_4NC)_2PdCl_2$ | 2 | $Fe_2Mo_7O_{24}$ (0.3) | 100 | 60 | 20 | 80 |
| $(4\text{-}CH_3OC_6H_4NC)(CO)PdCl_2$ (preformed) | 2 | $Fe_2Mo_7O_{24}$ (0.3) | 100 | 65 | 20 | 85 |

The aforementioned data demonstrate the advantage of utilizing an organic isocyanide and a molybdate as co-catalysts and further demonstrate the advantage of utilizing a preformed catalyst. However, either type of catalyst system containing an organic isocyanide exhibits improved

ILLUSTRATIVE EMBODIMENT V

A series of runs were made to the procedure of Illustrative Embodiment II to demonstrate the efficacy of various molybdates and borates as co-catalysts in the process of this invention. The data are presented in Table IV.

TABLE IV

| Catalyst | Millimoles palladium | Co-catalyst (g.) | Conversion weight, percent | Selectivity, percent | | |
|---|---|---|---|---|---|---|
| | | | | TDI | TMI | Total |
| $(4\text{-}CH_3OC_6H_4NC)_2PdCl_2$ | 2 | $Fe_2Mo_7O_{24}$ (0.3) | 100 | 60 | 20 | 80 |
| $(4\text{-}CH_3OC_6H_4NC)_2PdCl_2$ | 1 | $Fe_2Mo_7O_{24}$ (0.15) | 97 | 40 | 43 | 83 |
| $(4\text{-}CH_3OC_6H_4NC)_2PdCl_2$ | 1 | $MnMo_{20}O_{61}$ (0.15) | 96 | 35 | 45 | 80 |
| $(4\text{-}CH_3OC_6H_4NC)_2PdCl_2$ | 1 | $Fe_2(MoO_4)_3$ (0.15) | 96 | 40 | 43 | 8 |
| $(n\text{-}C_4H_9NC)_2PdCl_2$ | 1 | $Fe_2Mo_7O_{24}$ (0.15) | 90-93 | 23-27 | 49-44 | 71-72 |
| $(n\text{-}C_4H_9NC)_2PdCl_2$ | 2 | $FeBO_3$ (0.5) | 90 | 28 | 60 | 88 |

ILLUSTRATIVE EMBODIMENT VI

A series of runs was made according to the procedure of Illustrative Embodiment II wherein the efficacy of palladium dichloride and palladium dibromide were compared. The data are presented in Table V.

TABLE V

| Catalyst | Millimoles palladium | Co-catalyst (g.) | Conversion weight, percent | Selectivity, percent TDI | TMI | Total |
|---|---|---|---|---|---|---|
| $(n-C_4H_9NC)_2PdCl_2$ | 1 | $Fe_2Mo_7O_{24}$ (0.15) | 90 | 23 | 49 | 72 |
| $(n-C_4H_9NC)_2PdBr_2$ | 1 | $Fe_2Mo_7O_{24}$ (0.15) | 60 | 11 | 70 | 81 |
| $(n-C_4H_9NC)_2PdBr_2$ | 1 | $MnMo_{20}O_{61}$ (0.15) | 58 | 10 | 75 | 85 |

ILLUSTRATIVE EMBODIMENT VII

When the procedure of Illustrative Embodiment II is repeated with a catalyst system consisting of rhodium trichloride, 4-methoxyphenyl isocyanide and ferric heptamolybdate, a good yield of 2,4-toluene diisocyanate is obtained.

ILLUSTRATIVE EMBODIMENT VIII

When the procedure of Illustrative Embodiment II is repeated with bis(4-nitrophenyl)methane as the organic nitro compound, a good yield of bis(4-phenyl isocyanate) is obtained.

ILLUSTRATIVE EMBODIMENT IX

When the procedure of Illustrative Embodiment II is repeated except that the organic nitro compound is 1,3,5-trinitronaphthalene, a good yield of 1,3,5-naphthalene triisocyanate is obtained.

ILLUSTRATIVE EMBODIMENT X

When the procedure of Illustrative Embodiment II is repeated except that the organic nitro compound is a mixture of 2-isocyanato-4-nitrotoluene, 4-isocyanato-2-nitrotoluene and 2,4-dinitrotoluene, a good yield of 2,4-toluene diisoyanate is obtained.

ILLUSTRATIVE EMBODIMENT XI

When the procedure of Illustrative Embodiment II is repeated except that the organic nitro compound is 1-propyl-2,4-dinitrobenzene, a good yield of 1-propyl-2,4-diisocyanatobenzene is obtained.

ILLUSTRATIVE EMBODIMENT XII

When the procedure of Illustrative Embodiment II is repeated except that the organic polynitro compound is 1-chloro-2,4-dinitronaphthalene, a good yield of 1-chloro-2,4-naphthalene diisocyanate is obtained.

ILLUSTRATIVE EMBODIMENT XIII

When the procedure of Illustrative Embodiment II is repeated except that the organic polynitro compound is 2,7-dinitrophenathrene, a good yield of 2,7-phenanthrene diisocyanate is obtained.

ILLUSTRATIVE EMBODIMENT XIV

When the procedure of Illustrative Embodiment II is repeated using vinyl isocyanide in place of 4-methoxyphenylisocyanide, a good yield of 2,4-toluene diisocyanate is obtained.

ILLUSTRATIVE EMBODIMENT XV

When the procedure of Illustrative Embodiment II is repeated using 1-cyclohexenylisocyanide in place of 4-methoxyphenylisocyanide, a good yield of 2,4-toluene diisocyanate is obtained.

ILLUSTRATIVE EMBODIMENT XVI

When the procedure of Illustrative Embodiment II is repeated using diethylaminopropylisocyanide in place of 4-methoxyphenylisocyanide, a good yield of 2,4-toluene diisocyanate is obtained.

ILLUSTRATIVE EMBODIMENT XVII

When the procedure of Illustrative Embodiment II is repeated using carbethoxymethyl isocyanide in place of 4-methoxyphenyl isocyanide, a good yield of 2,4-toluene diisocyanide is obtained.

ILLUSTRATIVE EMBODIMENT XVIII

When the procedure of Illustrative Embodiment II is repeated using tolyl isocyanide in place of 4-methoxyphenylisocyanide, a good yield of 2,4-toluene diisocyanide is obtained.

I claim as my invention:

1. A process for the production of carbocyclic aromatic polyisocyanates which comprises contacting a carbocyclic polynitro compound with carbon monoxide, wherein the molar ratio of carbon monoxide to aromatic nitro group is from about 3:1 to about 100:1 in the presence of a catalyst system consisting essentially of (a) a noble metal halide, (b) an organic isocyanide of the formula $$R-N{\equiv}C$$

wherein R is monovalent hydrocarbyl of about 3 to 30 carbon atoms free of acetylenic unsaturation and with up to 2 aromatic rings and monovalent substituted hydrocarbyl of about 3 to 30 carbon atoms free from acetylenic unsaturation and with up to 2 aromatic rings, such substituent groups being inert to the reaction environment and (c) a catalyst promoter selected from the group consisting of iron molybdate, manganese molybdate and iron borate at a temperature of from about 100° C. to about 300° C. and at a carbon monoxide pressure of from about 500 p.s.i.g. to about 5000 p.s.i.g.

2. The process of claim 1 wherein the noble metal halide is palladium dichloride, rhodium trichloride, palladium dibromide, rhodium tribromide, palladium diiodide or rhodium triiodide.

3. The process of claim 2 wherein the organic isocyanide is represented by the formula $$R-N{\equiv}C$$

wherein R is alkyl, cycloalkyl, arylalkyl, aryl and alkaryl, and substituted alkyl, cycloalkyl, arylalkyl, aryl and alkaryl.

4. The process of claim 3 wherein the organic isocyanide is 4-methoxyphenyl isocyanide.

5. The process of claim 3 wherein the organic isocyanide is phenyl isocyanide.

6. The process of claim 3 wherein the organic isocyanide is cyclohexylisocyanide.

7. The process of claim 3 wherein the organic isocyanidide is n-butyl isocyanide.

8. The process of claim 3 wherein the catalyst promoter is ferric heptamolybdate.

9. The process of claim 3 wherein the catalyst promoter is manganese polymolybdate.

10. The process of claim 3 wherein the catalyst promoter is ferric orthoborate.

11. The process of claim 1 wherein the aromatic polynitro compound has at least two nitro groups and is represented by the formula $$\underset{R_m}{\bigotimes}(NO_2)_2$$

wherein $m$ is a whole number from 0 to 3 inclusive and R independently is nitro, alkyl, cycloalkyl, aralkyl, aryl or alkaryl of up to 10 carbon atoms, chlorine, bromine, alkoxy of up to 6 carbon atoms, aryloxy or alkaryloxy of up to 10 carbon atoms, aralkoxy of up to 10 carbon atoms, alkylthio of up to 6 carbon atoms or arylthio of up to 10 carbon atoms.

12. The process of claim 11 wherein the R groups of the aromatic polynitro compound are selected from chlorine, bromine, alkyl, cycloalkyl, aralkyl, aryl and alkaryl.

13. The process of claim 12 wherein the aromatic polynitro compound is dinitrotoluene.

14. The process of claim 1 wherein the aromatic polynitro compound is bis(4-nitrophenyl)methane.

References Cited

UNITED STATES PATENTS 3,576,836   4/1971   Prichard _____ 260—453
3,585,231   6/1971   Hurley, Jr. et al. ____ 260—453

LEWIS GOTTS, Primary Examiner

D. A. TORRENCE, Assistant Examiner

U.S. Cl. X.R.

252—429 C